United States Patent
Takagishi et al.

(10) Patent No.: US 6,507,547 B1
(45) Date of Patent: Jan. 14, 2003

(54) MEDIUM AND METHOD FOR RECORDING OPTICAL INFORMATION

(75) Inventors: Yoshikazu Takagishi, Tokyo (JP); Takanori Yoshizawa, Tokyo (JP); Kazuyuki Shibuya, Tokyo (JP); Emiko Hamada, Tokyo (JP)

(73) Assignee: Taiyo Yuden Co., Ltd. (JP)

( * ) Notice: Subject to any disclaimer, the term of this patent is extended or adjusted under 35 U.S.C. 154(b) by 0 days.

(21) Appl. No.: 09/531,208

(22) Filed: Mar. 20, 2000

(30) Foreign Application Priority Data

Mar. 23, 1999 (JP) ............................ 11-077484

(51) Int. Cl.[7] .............................. G11B 7/00; G11B 7/24
(52) U.S. Cl. ...................... 369/100; 369/275.1; 369/284
(58) Field of Search ........................... 369/275.1, 275.2, 369/275.3, 275.4, 100, 111, 284, 286, 288

(56) References Cited

U.S. PATENT DOCUMENTS

| | | | |
|---|---|---|---|
| 4,547,876 A | * 10/1985 | Ettenberg | 369/275.3 |
| 4,718,053 A | * 1/1988 | Sato et al. | 369/100 |
| 4,860,273 A | * 8/1989 | Sawano et al. | 369/275.1 |
| 5,090,009 A | * 2/1992 | Hamada et al. | 369/275.4 |
| 5,144,552 A | * 9/1992 | Abe | 369/111 |
| 5,155,723 A | * 10/1992 | Hamada et al. | 369/100 |
| 5,213,859 A | * 5/1993 | Aoi et al. | 369/275.1 |
| 5,238,723 A | 8/1993 | Yoshizawa et al. | |
| 5,326,679 A | * 7/1994 | Yanagisawa et al. | 369/284 |
| 5,407,719 A | 4/1995 | Hamada et al. | |
| 5,426,632 A | * 6/1995 | Murakami et al. | 369/275.4 |
| 5,428,599 A | * 6/1995 | Yashima et al. | 369/275.1 |
| 5,479,394 A | * 12/1995 | Yashima et al. | 369/286 |
| 5,521,901 A | * 5/1996 | Okada et al. | 369/275.2 |
| 5,776,656 A | 7/1998 | Shinkai et al. | |

FOREIGN PATENT DOCUMENTS

| | | |
|---|---|---|
| EP | 0837457 | 4/1998 |
| EP | 0840307 | 5/1998 |
| EP | 0895231 | 2/1999 |

* cited by examiner

Primary Examiner—Thang V. Tran
Assistant Examiner—Bach Q Vuong
(74) Attorney, Agent, or Firm—Ostrolenk, Faber, Gerb & Soffen, LLP

(57) ABSTRACT

Provided is a medium for recording optical information and a method for recording optical information that allow recording sensitivity to be increased, and particularly a prescribed recording sensitivity to be maintained together with reflectivity and other playback characteristics during high-speed recording, by employing the temperature dependence of recording sensitivity of the light-absorbing layer instead of the light attenuation coefficient of the light-absorbing layer, and selecting a material which is prone to increased absorption of a laser beam at high temperatures during recording. A distinctive feature is that the absorbance or recording sensitivity of the dye material film used in the medium for recording optical information that has a writable structure is dependent on temperature. Specifically, it was found that the absorption spectrum of the dye material varies at high temperatures, and a relation $A2/A1 \geq 1.30$ was established. In this relation, A1 (Abs) is an absorbance of the light-absorbing layer at a wavelength of recording light under room-temperature conditions, T (°C.) is a pyrolysis temperature of the light-absorbing layer, and A2 (Abs) is an absorbance at a wavelength of recording light under T−50 (°C.) conditions.

5 Claims, 5 Drawing Sheets

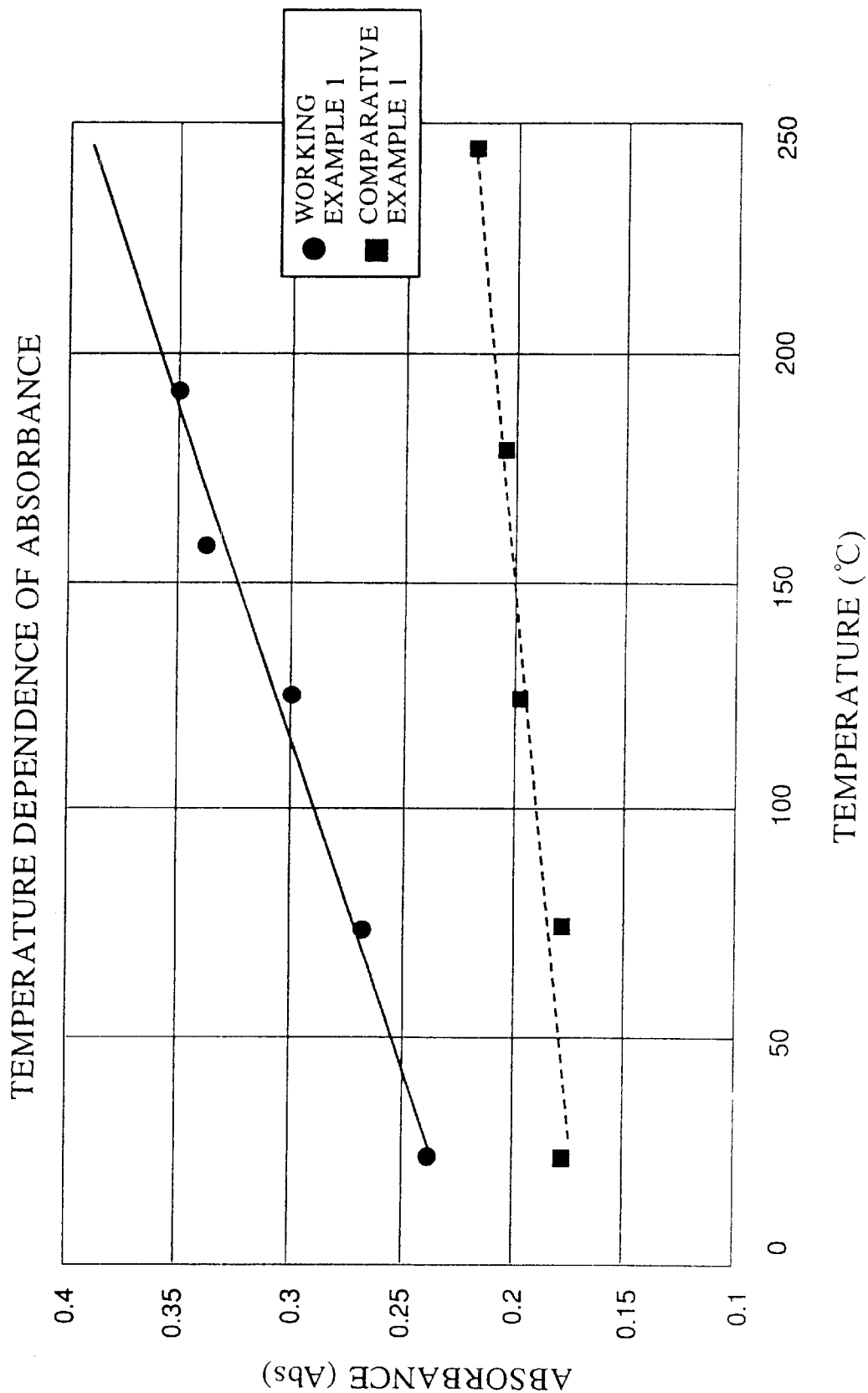

MEDIUM AND METHOD FOR RECORDING OPTICAL INFORMATION

BACKGROUND OF THE INVENTION

1. Field of the Invention

The present invention relates to a medium for recording optical information and to a method for recording optical information, and more particularly relates to a writable medium for recording optical information provided at least with a light-absorbing layer and a light-reflecting layer on a translucent substrate, and to a method for recording optical information.

2. Description of the Related Art

In conventional media (so-called "CD-Rs") for recording optical information that have writable structures, it is important not only to provide recorded disks with adequate playback characteristics, but also to achieve the needed recording sensitivity (that is, the low recording power that allows optimum recording to be performed) in order to be able to adequately deal with high-speed recording.

To reduce the recording power of a conventional medium for recording optical information, it has been suggested to enhance the recording sensitivity thereof by increasing the degree to which the light-absorbing layer absorbs light (that is, by increasing the light attenuation coefficient) or to increase the thickness of the light-absorbing layer and hence to enhance the overall light absorption of the dye film.

There are, however, limits as to how much recording sensitivity can be raised by the aforementioned techniques.

Specifically, a maximum reflectivity Rtop of 65% R or higher is needed in order to achieve the level of the Orange Book, which is a CD-R standard, but increasing the amount of light absorbed by the dye film above a certain level brings about reduced reflectivity and makes it impossible to satisfy the requirements of the Orange Book in terms of reflectivity.

In other words, achieving higher recording sensitivity with the aid of a conventional technique is disadvantageous because the result is often proportional to the light attenuation coefficient of the dye, so the light attenuation coefficient of the dye material in the a a laser beam wavelength region should be increased in order to ensure higher recording sensitivity, which is incompatible with maintaining adequate reflectivity. Because the light attenuation coefficient is proportional to the absorption of light (absorbance) in the dye material, increasing the light attenuation coefficient reduces reflectivity and increases the proportion of luminous energy absorbed by the dye film.

Consequently, with conventional techniques based on the light attenuation coefficient alone, it is difficult to provide the desired recording sensitivity while maintaining reflectivity on a par with the CD-R standard, particularly in light of the fact that keeping both recording sensitivity and reflectivity at a level suitable for high-speed recording is an indispensable condition.

SUMMARY OF THE INVENTION

An object of the present invention, which was perfected in view of the above-described shortcomings, is to provide a medium and a method for recording optical information that allow a prescribed recording sensitivity to be maintained together with the desired reflectivity and other playback characteristics, particularly under conditions of high-speed recording.

Another object of the present invention is to provide a medium and a method for recording optical information that allow recording sensitivity to be improved by adopting an approach in which a material prone to increased absorption of a a laser beam under high-temperature recording conditions is selected as the dye material used for CD-R.

Yet another object of the present invention is to provide a medium and a method for recording optical information that allow recording sensitivity to be increased using the temperature dependence of the recording sensitivity of the light-absorbing layer instead of the light attenuation coefficient thereof while maintaining playback characteristics at the same level as in the past.

Specifically, it was discovered in relation to the present invention that the absorbance or recording sensitivity of the dye material films used in CD-R disks (or in media (so-called DVD-R disks) for recording optical information that have writable structures in which shorter-wavelength a a laser beam is used) is dependent on temperature. Specifically, it was found that the absorption spectrum of a dye material varies at high temperatures and that recording sensitivity can be improved by selecting a material in which absorption of light is apt to increase at a high temperature. The first invention resides in a medium for recording optical information comprising a translucent pregrooved substrate; a light-absorbing layer that is formed on the substrate and that contains a light-absorbing substance composed of a dye for absorbing recording light based on a a laser beam; and a light-reflecting layer that is formed on the light-absorbing layer and is designed to reflect a a laser beam, wherein information is recorded by irradiating the light-absorbing layer with recording light, the aforementioned medium for recording optical information being characterized by satisfying a relation $A2/A1 \geq 1.30$, where A1 (Abs) is an absorbance of the light-absorbing layer at a wavelength of recording light under room-temperature conditions, T (°C.) is a pyrolysis temperature of the light-absorbing layer, and A2 (Abs) is an absorbance at a wavelength of said recording light under T–50 (°C.) conditions.

The second invention resides in a method for recording optical information on a medium for recording optical information comprising a translucent pregrooved substrate; a light-absorbing layer that is formed on the substrate and that contains a light-absorbing substance composed of a dye for absorbing recording light based on a laser beam; and a light-reflecting layer that is formed on the light-absorbing layer and is designed to reflect a laser beam, wherein information is recorded on the medium for recording optical information by irradiating the light-absorbing layer with recording light; the method for recording optical information involving directing recording light to the light-absorbing layer satisfying a relation $A2/A1 \geq 1.30$, where A1 (Abs) is an absorbance of the light-absorbing layer at a wavelength of recording light under room-temperature conditions, T (°C.) is a pyrolysis temperature of the light-absorbing layer, and A2 (Abs) is an absorbance at a wavelength of recording light under T–50(°C.) conditions.

It is possible to satisfy a relation $N \geq 2.0 \times 10^{-4}$, where N (Abs/°C.) is a rate at which an absorbance of the light-absorbing layer varies at a wavelength of recording light under temperature conditions ranging from room temperature to the pyrolysis temperature.

It is also possible to satisfy relations $40 \leq dav \leq 100$ and $0.15 \leq A1 \leq 0.25$, where dav (nm) is the mean thickness of the light-absorbing layer.

A more-detailed description will now be given.

FIG. 1 is an enlarged cross section of an example of the medium 1 for recording optical information in accordance with the present invention. The medium 1 for recording optical information comprises a translucent substrate 2, a light-absorbing layer 3 (recording layer) formed on the substrate 2, a light-reflecting layer 4 formed on the light-absorbing layer 3, and a protective layer 5 formed on the light-reflecting layer 4.

The substrate 2 is provided with a spiral pregroove 6. Portions other than the pregroove 6, that is, lands 7, are disposed on the right and left of the pregroove 6.

The substrate 2 and light-absorbing layer 3 are in contact with each other along a first layer boundary 8. The light-absorbing layer 3 and light-reflecting layer 4 are in contact with each other along a second layer boundary 9. The light-reflecting layer 4 and protective layer 5 are in contact with each other along a third layer boundary 10.

It can be seen in the drawing that when the medium 1 for recording optical information is irradiated with recording light (recording a laser beam) L1, heat is evolved as a result of the fact that the dye in the light-absorbing layer 3 absorbs the energy of this a laser beam L1, creating thermal deformation on the side of the substrate 2 and forming pits 11. Another phenomenon affecting the recording area is that the refractive index of the areas occupied by the pits 11 is changed by the pyrolysis of the dye in the light-absorbing layer 3.

Irradiating the areas occupied by the pits 11 with playback light (playback a laser beam) L2 creates pit contrast and makes it possible to read data on the basis of the thermal deformation of the substrate 2 in the areas occupied by the pits 11 and on the basis of the diffraction of light resulting from the difference in optical phase (based on the difference in refractive index) between the areas occupied by the pits 11 and the areas (lands 7) devoid of pits.

In the case of the above-described medium 1 for recording optical information, the inventors discovered that the absorbance of the dye material film used for CD-R or DVD-R disks depends on temperature. Specifically, the absorption of light by the dye in the light-absorbing layer 3 at the laser wavelength varies with temperature and tends to increase at higher temperatures.

FIG. 2 is a graph depicting the manner in which absorbance is related to laser wavelength. In the drawing, the solid line depicts a low-temperature (room-temperature) absorption spectrum; the broken line, a high-temperature absorption spectrum.

The broadening of the absorption spectrum of a dye film in FIG. 2 is known to result from interaction based on the intermolecular forces and hydrogen bond forces of dye molecules. It is believed that this interaction changes at high temperatures, when molecular vibration intensifies, bringing above changes in the absorption spectrum of the dye film.

As can be seen in the drawing, a dye film composed of a dye material having a pronounced temperature dependence is heated by being irradiated with a powerful laser during signal recording, causing the absorption spectrum to vary widely between the visible region and the near-infrared region (causing absorbance to reverse at room temperature and at a high temperature, or during recording).

The temperature dependence of the absorption spectrum depends on the molecular structure of the dye. Benzoindobenzodicarbocyanine, for example, has large molecular side chains, and a pronounced effect is observed in materials whose association properties tend to diminish. Considerable changes in absorption spectra are also obtained when stabilizers and other additives are introduced.

Recording sensitivity can be improved because absorption at longer wavelengths increases in the particular case of absorption spectra corresponding to the recording laser wavelength.

In materials with a pronounced tendency of absorption spectra to change due to such a temperature dependence, the recording laser power can be reduced because a laser beam absorption capabilities can be improved in the high-temperature state created by laser irradiation and heating.

Specifically, increased light absorption at high temperatures causes more light to be absorbed by the dye film at the recording temperature of 200° C. or higher, but the increase in the absorption of light by the dye film is small because the laser power supplied during normal read operation produces a low temperature.

The present invention should satisfy the relation $A2/A1 \geq 1.30$, where A1 (Abs) is the absorbance of the light-absorbing layer 3 at the wavelength of recording light L1 under room temperature conditions, T (°C.) is the pyrolysis temperature of the light-absorbing layer 3, and A2 (Abs) is the absorbance at the wavelength of recording light L1 under T|50 (°C.) conditions, as shown in FIG. 2. The reason that absorbance is defined at (T−50)°C. rather than at the elevated pyrolysis temperature T°C. is that absorbance can be measured at (T−50)°C. but cannot be measured at the pyrolysis temperature T°C. due to dye decomposition.

When A2/A1 is less than 1.30, it is difficult to obtain adequate recording sensitivity or reflectivity.

The relation $N \geq 2.0 \times 10^{-4}$ should also be satisfied. In this relation, N (Abs/°C.) is the rate at which the absorbance of the light-absorbing layer 3 varies at the wavelength of recording light L1 under temperature conditions ranging from room temperature to the pyrolysis temperature T.

When N is less than $2.0 \times 10^{-4}$ (Abs/°C.), it is difficult to obtain adequate recording sensitivity or reflectivity.

The relations $40 \leq dav \leq 100$ and $0.15 \leq A1 \leq 0.25$ should also be satisfied. In these relations, dav (nm) is the mean thickness of the light-absorbing layer 3.

When dav is less than 40 nm, it is difficult to secure an adequate modulation factor (pit contrast) because adequate optical changes are less likely to occur in the light-absorbing layer during recording.

When dav is greater than 100 nm, more heat is accumulated in the light-absorbing layer during recording, thus creating teardrop-type pit changes and distorting the playback signal.

When A1 is less than 0.15, adequate recording sensitivity is difficult to obtain.

When A1 is greater than 0.25, it is difficult to maintain adequate reflectivity during playback.

The inventors have confirmed that a more dramatic situation develops during high-speed recording when the aforementioned absorbance ratio A2/A1, absorbance change rate N, mean thickness dav, and the like fall outside the prescribed ranges of numerical values.

The medium for recording optical information in accordance with the present invention thus allows the laser power needed for the high-temperature light-absorbing layer during recording to be reduced, light absorption to be kept at its normal level during playback, and adequate reflectivity to be maintained without being affected in any way.

Specifically, enhancing light absorption at the wavelength of a laser beam under high-temperature conditions allows light absorption and elevated temperatures to act synergistically during recording by laser irradiation, and pits to be formed with low recording power.

In addition, the small temperature increase during playback results in low light absorption and makes it possible to maintain adequate reflectivity.

BRIEF DESCRIPTION OF THE DRAWINGS

FIG. 7 is a graph depicting the temperature dependence of absorbance in Working Example 1 and Comparative Example 1.

Figure 1:
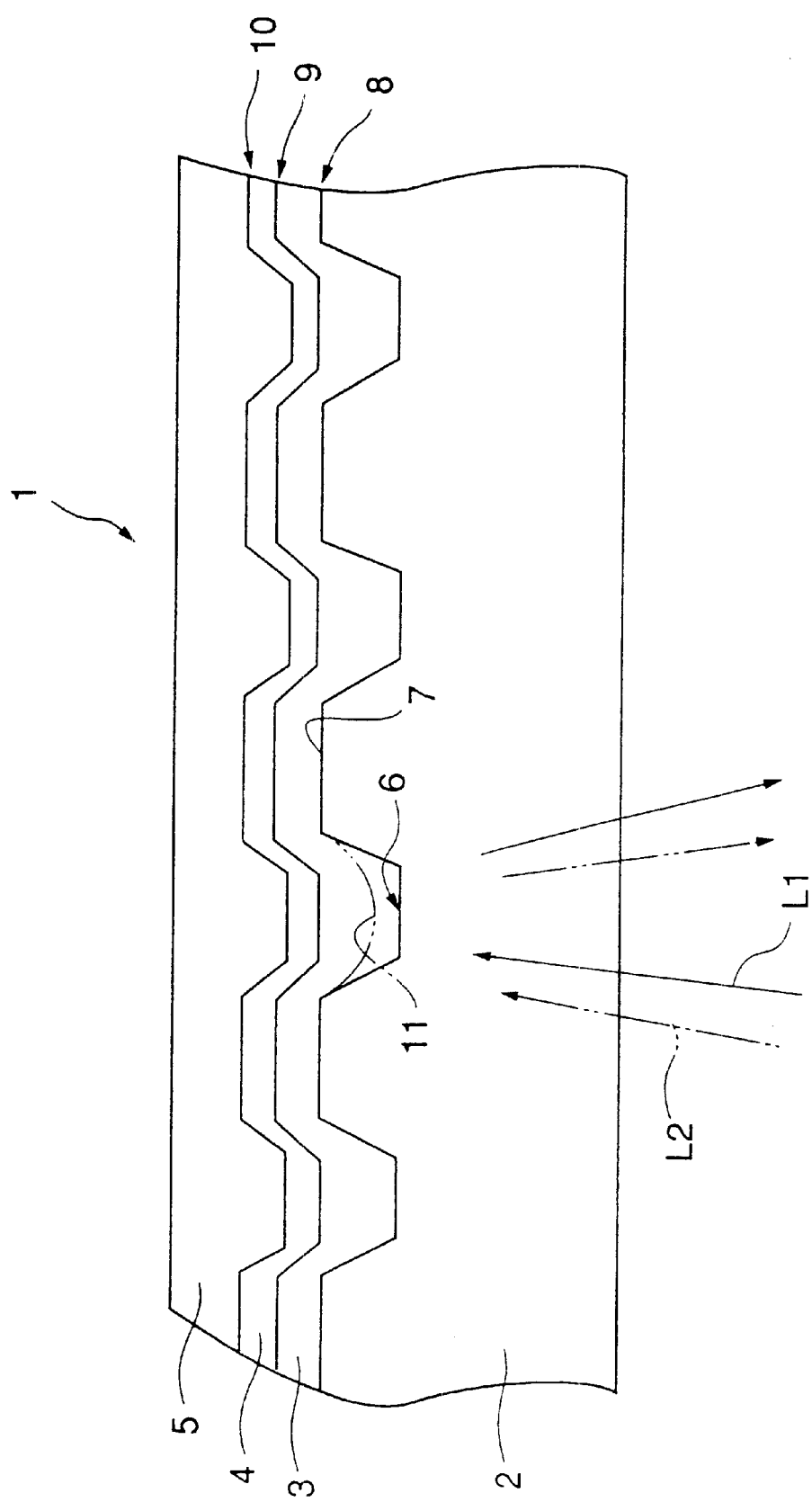
FIG. 1 is an enlarged cross section of an example of the medium 1 for recording optical information in accordance with the present invention.
Figure 2:
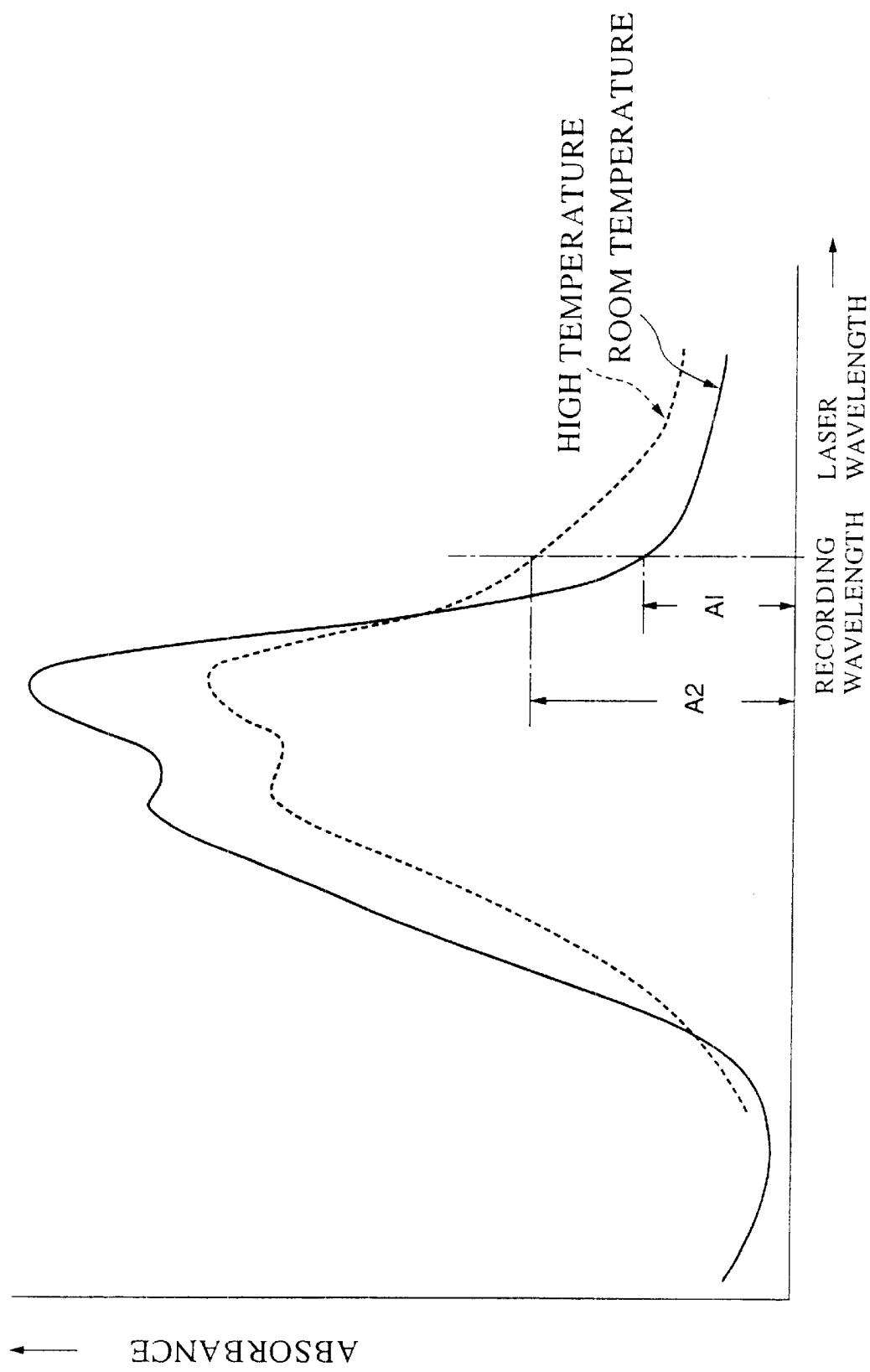
FIG. 2 is a graph depicting the manner in which absorbance is related to laser wavelength.

In the drawings, 1 is a medium for recording optical information (FIG. 1), 2 a translucent substrate, 3 a light-absorbing layer (recording layer), 4 a light-reflecting layer, 5 a protective layer, 6 a spiral pregroove, 7 a land, 8 a first layer boundary between the substrate 2 and light-absorbing layer 3, 9 a second layer boundary between the light-absorbing layer 3 and light-reflecting layer 4, 10 a third layer boundary between the light-reflecting layer 4 and protective layer 5, 11 a pit, L1 recording light (recording a laser beam), and L2 playback light (playback a laser beam).

DESCRIPTION OF THE PREFERRED EMBODIMENTS

Working Examples 1 to 4 and Comparative Examples 1 and 2 will now be described with reference to FIGS. 3 to 7.

WORKING EXAMPLE 1

Extrusion molding was performed to obtain a polycarbonate substrate 2 measuring 120 mm in outside diameter, 15 mm in inside diameter, and 1.2 mm in thickness and having on the surface thereof a spiral pregroove 6 with a groove pitch of 1.6 μm, a groove width of 0.55 μm, and a groove depth of 160 nm.

Figure 3:
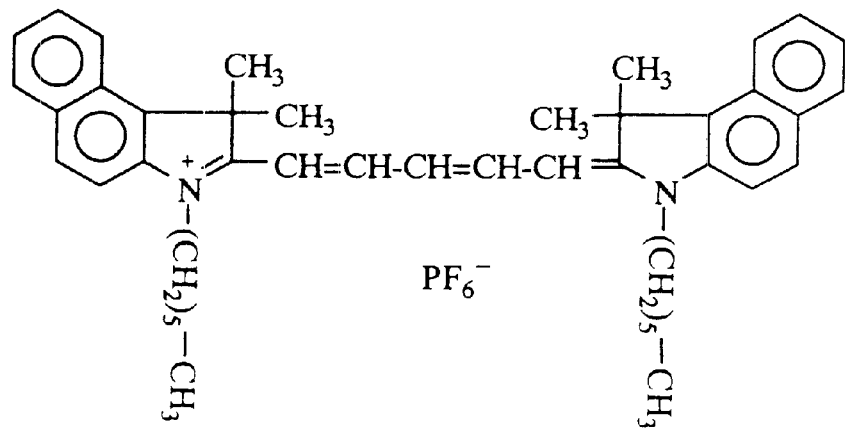
FIG. 3 is a diagram depicting the structural formula of the cyanine dye used as the recording dye in Working Examples 1 and 2.

A cyanine dye (recording dye; 86 weight parts) whose structure is shown in FIG. 3, and the aminium salt N,N-bis(4-dibutylaminophenyl)-aminium perchlorate (light stabilizer; 14 weight parts) were dissolved in methyl cellosolve (25 g/L), and the resulting solution was applied by spin coating to the above-described substrate 2, yielding a light-absorbing layer 3 with a thickness dav of 95 nm.

Measured at the recording laser wavelength (780 nm) and a temperature of 25° C. (room temperature), the absorbance A1 of this light-absorbing layer 3 was 0.24 Abs.

Measured by differential thermal analysis, the pyrolysis temperature T of the light-absorbing layer 3 was 242° C. A light-absorbing layer 3 was then formed by spin coating on a glass substrate in the same thickness dav as above, and absorbance A1 was measured at a temperature of 25° C., as was absorbance A2 at (T−50)°C., or 192° C. The results were 0.24 Abs and 0.35 Abs, respectively, which corresponded to A2/A1=1.46.

The rate N at which absorbance varied at the laser wavelength under temperature conditions ranging from room temperature (25° C.) to the pyrolysis temperature (242° C.) was 6.6×10$^{-4}$ (Abs/°C.).

A silver (Ag) light-reflecting layer 4 with a thickness of 100 nm was formed by sputtering on the substrate 2 having a dye film (on the light-absorbing layer 3).

An ultraviolet-curing resin (SD-211, manufactured by Dainippon Ink & Chemicals) was then applied by spin coating to the light-reflecting layer 4, the resin was irradiated with ultraviolet light, and a protective layer 5 with a thickness of 10 μm was formed, yielding a medium 1 for recording optical information.

The resulting medium 1 for recording optical information was recorded at a linear speed of 5.6 m/s (4× speed) with the aid of a recorder (CD-R100, manufactured by Yamaha) operated using a laser beam with a wavelength of 787 nm.

The corresponding optimum recording power was 12.6 mW, which was sufficiently low for extended, stable, and continuous recording. The reflectivity Rtop at the level of the corresponding eye-pattern signal was measured and found to be 66%, which satisfied the aforementioned Orange Book standard.

WORKING EXAMPLE 2

Extrusion molding was performed to obtain a polycarbonate substrate 2 measuring 120 mm in outside diameter, 15 mm in inside diameter, and 1.2 mm in thickness and having on the surface thereof a spiral pregroove 6 with a groove pitch of 1.6 μm, a groove width of 0.55 μm, and a groove depth of 160 nm.

A cyanine dye (recording dye; 86 weight parts) whose structure is shown in FIG. 3, and the aminium salt N,N-bis(4-dibutylaminophenyl)-aminium perchlorate (light stabilizer; 14 weight parts) were dissolved in methyl cellosolve (25 g/L), and the resulting solution was applied by spin coating to the above-described substrate 2, yielding a light-absorbing layer 3 with a thickness dav of 42 nm.

Measured at the recording laser wavelength (780 nm) and a temperature of 25° C. (room temperature), the absorbance A1 of this light-absorbing layer 3 was 0.15 Abs.

Measured by differential thermal analysis, the pyrolysis temperature T of the light-absorbing layer 3 was 242° C. A light-absorbing layer 3 was then formed by spin coating on a glass substrate in the same thickness dav as above, and absorbance A1 was measured at a temperature of 25° C., as was absorbance A2 at (T−50)°C., or 192° C. The results were 0.15 Abs and 0.20 Abs, respectively, which corresponded to A2/A1=1.33.

The rate N at which absorbance varied at the laser wavelength under temperature conditions ranging from room temperature (25° C.) to the pyrolysis temperature (242° C.) was 2.9×10$^{-4}$ (Abs/°C.).

A silver (Ag) light-reflecting layer 4 with a thickness of 100 nm was formed by sputtering on the substrate 2 having a dye film (on the light-absorbing layer 3).

An ultraviolet-curing resin (SD-211, manufactured by Dainippon Ink & Chemicals) was then applied by spin coating to the light-reflecting layer 4, the resin was irradiated with ultraviolet light, and a protective layer 5 with a thickness of 10 μm was formed, yielding a medium 1 for recording optical information.

The resulting medium 1 for recording optical information was recorded at a linear speed of 5.6 m/s (4×speed) with the aid of a recorder (CD-R100, manufactured by Yamaha) operated using a laser beam with a wavelength of 787 nm.

The corresponding optimum recording power was 14.2 mW, which was sufficiently low for extended, stable, and continuous recording. The reflectivity Rtop at the level of the corresponding eye-pattern signal was measured and found to be 72%, which satisfied the aforementioned Orange Book standard.

WORKING EXAMPLE 3

Extrusion molding was performed to obtain a polycarbonate substrate 2 measuring 120 mm in outside diameter, 15 mm in inside diameter, and 1.2 mm in thickness and having on the surface thereof a spiral pregroove 6 with a groove pitch of 1.6 μm, a groove width of 0.52 μm, and a groove depth of 100 nm.

Figure 4:
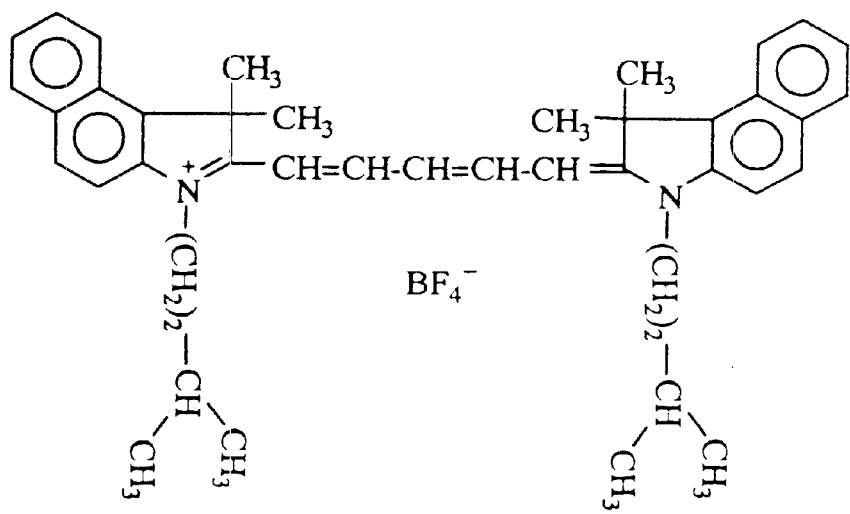
FIG. 4 is a diagram depicting the structural formula of the cyanine dye used as the recording dye in Working Example 3.

A cyanine dye (recording dye; 100 weight parts) whose structure is shown in FIG. 4 was dissolved in methyl cellosolve (20 g/L), and the resulting solution was applied by spin coating to the above-described substrate 2, yielding a light-absorbing layer 3 with a thickness dav of 60 nm.

Measured at the recording laser wavelength (780 nm) and a temperature of 25° C. (room temperature), the absorbance A1 of this light-absorbing layer 3 was 0.18 Abs.

Measured by differential thermal analysis, the pyrolysis temperature T of the light-absorbing layer 3 was 223° C. A light-absorbing layer 3 was then formed by spin coating on a glass substrate in the same thickness dav as above, and absorbance A1 was measured at a temperature of 25° C., as was absorbance A2 at (T−50)°C., or 173° C. The results were 0.18 Abs and 0.36 Abs, respectively, which corresponded to A2/A1=2.0.

The rate N at which absorbance varied at the laser wavelength under temperature conditions ranging from room temperature (25° C.) to the pyrolysis temperature (223° C.) was $1.1 \times 10^{-4}$ (Abs/°C.).

A silver (Ag) light-reflecting layer 4 with a thickness of 100 nm was formed by sputtering on the substrate 2 having a dye film (on the light-absorbing layer 3).

An ultraviolet-curing resin (SD-211, manufactured by Dainippon Ink & Chemicals) was then applied by spin coating to the light-reflecting layer 4, the resin was irradiated with ultraviolet light, and a protective layer 5 with a thickness of 10 μm was formed, yielding a medium 1 for recording optical information.

The resulting medium 1 for recording optical information was recorded at a linear speed of 5.6 m/s (4× speed) with the aid of a recorder (CD-R100, manufactured by Yamaha) operated using a laser beam with a wavelength of 787 nm.

The corresponding optimum recording power was 11.6 mW, which was sufficiently low for extended, stable, and continuous recording. The reflectivity Rtop at the level of the corresponding eye-pattern signal was measured and found to be 68%, which satisfied the aforementioned Orange Book standard.

WORKING EXAMPLE 4

Extrusion molding was performed to obtain a polycarbonate substrate 2 (for DVD-R) measuring 120 mm in outside diameter, 15 mm in inside diameter, and 0.6 mm in thickness and having on the surface thereof a spiral pregroove 6 with a groove pitch of 0.8 μm, a groove width of 0.40 μm, and a groove depth of 100 nm.

Figure 5:
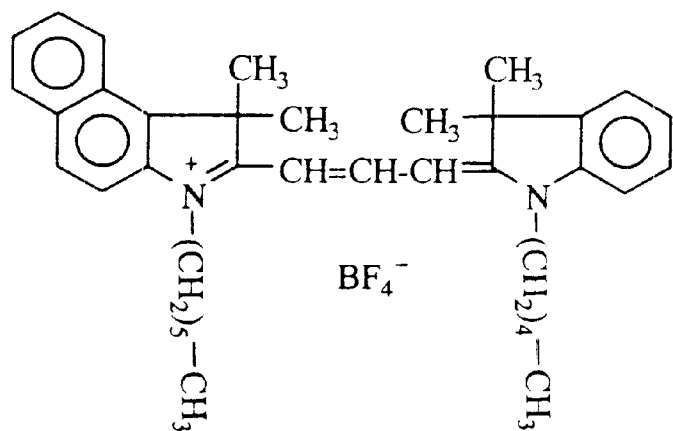
FIG. 5 is a diagram depicting the structural formula of the cyanine dye used as the recording dye in Working Example 4.

A cyanine dye (recording dye; 100 weight parts) whose structure is shown in FIG. 5 was dissolved in methyl cellosolve (25 g/L), and the resulting solution was applied by spin coating to the above-described substrate 2, yielding a light-absorbing layer 3 with a thickness dav of 60 nm.

Measured at the recording laser wavelength (635 nm) and a temperature of 25° C. (room temperature), the absorbance A1 of this light-absorbing layer 3 was 0.15 Abs.

Measured by differential thermal analysis, the pyrolysis temperature T of the light-absorbing layer 3 was 295° C. A light-absorbing layer 3 was then formed by spin coating on a glass substrate in the same thickness dav as above, and absorbance A1 was measured at a temperature of 25° C., as was absorbance A2 at (T−50)°C., or 245° C. The results were 0.15 Abs and 0.22 Abs, respectively, which corresponded to A2/A1=1.46.

The rate N at which absorbance varied at the laser wavelength under temperature conditions ranging from room temperature (25° C.) to the pyrolysis temperature (295° C.) was $3.2 \times 10^{-4}$ (Abs/°C.)

A silver (Ag) light-reflecting layer 4 with a thickness of 100 nm was formed by sputtering on the substrate 2 having a dye film (on the light-absorbing layer 3).

An ultraviolet-curing resin was then applied by spin coating to the light-reflecting layer 4, a polycarbonate support substrate having an outside diameter of 120 mm, an inside diameter of 15 mm, and a thickness of 0.6 mm was placed on top, the assembly was irradiated with ultraviolet light from the side of the support substrate, and the two substrates were bonded.

The resulting medium for recording optical information was recorded at a linear speed of 7.0 m/s with the aid of a recorder operated using a laser beam having a maximum effective output of 20 mW and a wavelength of 640 nm.

The corresponding optimum recording power was 17.0 mW, which was sufficiently low for extended, stable, and continuous recording. The reflectivity Rtop at the level of the corresponding eye-pattern signal was measured and found to be 54%, which was sufficient for adequate playback.

Comparative Example 1

Extrusion molding was performed to obtain a polycarbonate substrate 2 measuring 120 mm in outside diameter, 15 mm in inside diameter, and 1.2 mm in thickness and having on the surface thereof a spiral pregroove 6 with a groove pitch of 1.6 μm, a groove width of 0.55 μm, and a groove depth of 160 nm.

Figure 6:
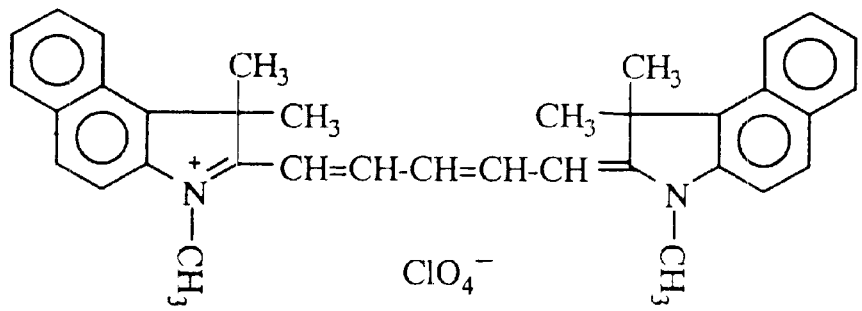
FIG. 6 is a diagram depicting the structural formula of the cyanine dye used as the recording dye in Comparative Examples 1 and 2.

A cyanine dye (recording dye; 86 weight parts) whose structure is shown in FIG. 6, and the aminium salt N,N-bis (4-dibutylaminophenyl)-aminium perchlorate (light stabilizer; 14 weight parts) were dissolved in methyl cellosolve (25 g/L), and the resulting solution was applied by spin coating to the above-described substrate 2, yielding a light-absorbing layer 3 with a thickness dav of 65 nm.

Measured at the recording laser wavelength (780 nm) and a temperature of 25° C. (room temperature), the absorbance A1 of this light-absorbing layer 3 was 0.18 Abs.

Measured by differential thermal analysis, the pyrolysis temperature T of the light-absorbing layer 3 was 296° C. A light-absorbing layer 3 was then formed by spin coating on a glass substrate in the same thickness dav as above, and absorbance A1 was measured at a temperature of 25° C., as was absorbance A2 at (T−50)°C., or 246° C. The results were 0.18 Abs and 0.22 Abs, respectively, which corresponded to A2/A1=1.22.

The rate N at which absorbance varied at the laser wavelength under temperature conditions ranging from room temperature (25° C.) to the pyrolysis temperature (296° C.) was $1.9 \times 10^{-4}$ (Abs/°C.).

A silver (Ag) light-reflecting layer 4 with a thickness of 100 nm was formed by sputtering on the substrate 2 having a dye film (on the light-absorbing layer 3).

An ultraviolet-curing resin (SD-211, manufactured by Dainippon Ink & Chemicals) was then applied by spin coating to the light-reflecting layer 4, the resin was irradiated with ultraviolet light, and a protective layer 5 with a thickness of 10 μm was formed, yielding a medium 1 for recording optical information.

The resulting medium 1 for recording optical information was recorded at a linear speed of 5.6 m/s (4× speed) with the aid of a recorder (CD-R100, manufactured by Yamaha) operated using a laser beam with a wavelength of 787 nm.

The corresponding optimum recording power was 16.4 mW, which was too high for extended, stable, and continuous recording.

Comparative Example 2

Extrusion molding was performed to obtain a polycarbonate substrate 2 measuring 120 mm in outside diameter, 15 mm in inside diameter, and 1.2 mm in thickness and having on the surface thereof a spiral pregroove 6 with a groove pitch of 1.6 μm, a groove width of 0.55 μm, and a groove depth of 160 nm.

A cyanine dye (recording dye; 86 weight parts) whose structure is shown in FIG. 6 was dissolved in methyl cellosolve (20 g/L), and the resulting solution was applied by spin coating to the above-described substrate 2, yielding a light-absorbing layer 3 with a thickness dav of 50 nm.

Measured at the recording laser wavelength (780 nm) and a temperature of 25° C. (room temperature), the absorbance A1 of this light-absorbing layer 3 was 0.17 Abs.

Measured by differential thermal analysis, the pyrolysis temperature T of the light-absorbing layer 3 was 315° C. A light-absorbing layer 3 was then formed by spin coating on a glass substrate in the same thickness dav as above, and absorbance A1 was measured at a temperature of 25° C., as was absorbance A2 at (T−50)°C., or 265° C. The results were 0.17 Abs and 0.22 Abs, respectively, which corresponded to A2/A1=1.29.

The rate N at which absorbance varied at the laser wavelength under temperature conditions ranging from room temperature (25° C.) to the pyrolysis temperature (315° C.) was $1.9 \times 10^{-4}$ (Abs/°C.)

A silver (Ag) light-reflecting layer 4 with a thickness of 100 nm was formed by sputtering on the substrate 2 having a dye film (on the light-absorbing layer 3).

An ultraviolet-curing resin (SD-211, manufactured by Dainippon Ink & Chemicals) was then applied by spin coating to the light-reflecting layer 4, the resin was irradiated with ultraviolet light, and a protective layer 5 with a thickness of 10 μm was formed, yielding a medium 1 for recording optical information.

The resulting medium 1 for recording optical information was recorded at a linear speed of 5.6 m/s (4× speed) with the aid of a recorder (CD-R100, manufactured by Yamaha) operated using a laser beam with a wavelength of 787 nm.

The corresponding optimum recording power was 16.0 mW, which was too high for extended, stable, and continuous recording.

FIG. 7 is a graph depicting the temperature dependence of absorbance in Working Example 1 and Comparative Example 1 above. As demonstrated in Working Examples 1 to 4 and in Comparative Examples 1 and 2 above, the gradient of the graph, that is, the absorbance change rate N (Abs/°C.), varies significantly in terms of recording sensitivity.

The present invention thus allows recording sensitivity to be improved and adequate reflectivity maintained during playback by confining the ration of absorbances at high temperatures and room temperature to a prescribed range.

What is claimed is:

1. A medium for recording optical information, comprising:

a translucent pregrooved substrate;

a light-absorbing layer that is formed on the substrate and that contains a light-absorbing substance composed of a dye for absorbing recording light based on a laser beam; and a light-reflecting layer that is formed on the light-absorbing layer and is designed to reflect a laser beam, wherein information is recorded by irradiating said light-absorbing layer with said recording light; said medium for recording optical information satisfying a relation $$A2/A1 \geq 1.30,$$

where A1 (Abs) is an absorbance of said light-absorbing layer at a wavelength of said recording light under room-temperature conditions, T (°C.) is a pyrolysis temperature of said light-absorbing layer, and A2 (Abs) is an absorbance at a wavelength of said recording light under T−50 (°C.) conditions.

2. A medium for recording optical information as defined in claim 1, satisfying a relation $$N \geq 2.0 \times 10^{-4},$$

where N (Abs/°C.) is a rate at which an absorbance of said light-absorbing layer varies at a wavelength of said recording light under temperature conditions ranging from room temperature to the pyrolysis temperature.

3. A medium for recording optical information as defined in claim 1, satisfying relations $$40 \leq dav \leq 100 \text{ and } 0.15 \leq A1 \leq 0.25,$$

where dav (nm) is the mean thickness of said light-absorbing layer.

4. A method for recording optical information on a medium for recording optical information comprising a translucent pregrooved substrate;

a light-absorbing layer that is formed on the substrate and that contains a light-absorbing substance composed of a dye for absorbing recording light based on a laser beam; and a light-reflecting layer that is formed on the light-absorbing layer and is designed to reflect a laser beam, wherein information is recorded on the medium for recording optical information by irradiating said light-absorbing layer with said recording light; said method for recording optical information involving directing said recording light to said light-absorbing layer, which satisfies a relation $$A2/A1 \geq 1.30,$$

where A1 (Abs) is an absorbance of said light-absorbing layer at a wavelength of said recording light under room-temperature conditions, T (°C.) is a pyrolysis temperature of said light-absorbing layer, and A2 (Abs) is an absorbance at a wavelength of said recording light under T−50 (°C.) conditions.

5. A medium for recording optical information as defined in claim 2, satisfying relations $$40 \leq dav \leq 100 \text{ and } 0.15 \leq A1 \leq 0.25,$$

where dav (nm) is the mean thickness of said light-absorbing layer.

* * * * *